United States Patent
Dhayni

(10) Patent No.: US 9,306,630 B2
(45) Date of Patent: Apr. 5, 2016

(54) NEAR FIELD COMMUNICATION ENABLED DEVICE WITH IMPROVED ELECTROMAGNETIC COMPATIBILITY AND A METHOD OF LOAD MODULATING IN NEAR FIELD COMMUNICATION

(71) Applicant: STMicroelectronics International N.V., Amsterdam (NL)

(72) Inventor: Achraf Dhayni, Vallauris (FR)

(73) Assignee: STMicroelectronics International N.V., Amsterdam (NL)

( * ) Notice: Subject to any disclaimer, the term of this patent is extended or adjusted under 35 U.S.C. 154(b) by 7 days.

(21) Appl. No.: 14/324,512

(22) Filed: Jul. 7, 2014

(65) Prior Publication Data

US 2015/0011161 A1    Jan. 8, 2015

(30) Foreign Application Priority Data

Jul. 8, 2013 (EP) .................................... 13368020

(51) Int. Cl.
*H04B 5/00* (2006.01)

(52) U.S. Cl.
CPC ............ *H04B 5/0031* (2013.01); *H04B 5/0075* (2013.01); *H04B 5/0068* (2013.01)

(58) Field of Classification Search
CPC ... H04B 5/0031; H04B 5/0068; H04B 5/0075
See application file for complete search history.

(56) References Cited

U.S. PATENT DOCUMENTS

| | | | |
|---|---|---|---|
| 2008/0079546 A1 | 4/2008 | Alicot et al. | |
| 2009/0027173 A1* | 1/2009 | Forster ............... | G06K 19/0717 340/10.41 |
| 2010/0009627 A1* | 1/2010 | Huomo ............... | H04B 5/0031 455/41.1 |
| 2010/0112941 A1* | 5/2010 | Bangs .................. | H04B 5/0012 455/41.1 |
| 2011/0053503 A1* | 3/2011 | Witschnig ........... | H04B 5/0031 455/41.1 |
| 2012/0094599 A1* | 4/2012 | Takeyama ............ | H01Q 1/243 455/41.1 |
| 2015/0249510 A1* | 9/2015 | Dhayni ............ | G01R 31/31716 455/41.1 |

FOREIGN PATENT DOCUMENTS

WO    WO-03105077 A1    12/2003
WO    WO-2009015115 A1    1/2009

OTHER PUBLICATIONS

EPO Search Report for EP 13368020.7 mailed Dec. 13, 2013 (7 pages).

* cited by examiner

*Primary Examiner* — David Bilodeau
(74) *Attorney, Agent, or Firm* — Gardere Wynne Sewell LLP

(57) ABSTRACT

A near field communication (NFC) initiator communicates with a target device. The carrier is modulated to transmit a digital signal. During time slots allocated for target communication, the field is load modulated by the target. The target load modulator is driven by a digital modulator to vary voltage at antenna terminals so that peak amplitude of the carrier varies for specified periods between high and low values. To alleviate interference in the target device caused by the generation of aliases during transition, the load modulator sequentially applies a range of resistances to vary the amplitude (voltage) during transition according to a specific waveform determined by the infinite impulse response of a low pass filter tuned to the cut of frequency and sampling frequency determined according to the coexistence and cohabitation specifications of a chip in which the NFC functionality is embedded.

8 Claims, 4 Drawing Sheets

NEAR FIELD COMMUNICATION ENABLED DEVICE WITH IMPROVED ELECTROMAGNETIC COMPATIBILITY AND A METHOD OF LOAD MODULATING IN NEAR FIELD COMMUNICATION

PRIORITY CLAIM

This application claims priority from European Application for Patent No. 13368020.7 filed Jul. 8, 2013, the disclosure of which is incorporated by reference.

TECHNICAL FIELD

The present invention relates to near field communications and, in particular, to improving near field communication (NFC) in NFC enabled devices using load modulation. The present invention concerns enabling such NFC devices generally, and its scope should be understood accordingly, however, the invention will be described with specific reference to implementation in a cell phone.

BACKGROUND

NFC technologies are described in the prior published specifications of the NFC Forum, which may be found at "http://www.nfc-forum.org/specs/" and are incorporated into this specification by reference. In general, NFC communication takes place at a frequency of 13.56 MHz over a range of less than 20 cm, more usually 10 cm or less. It enables an exchange of data between at least two devices, one of which, an initiator, is generally acting as an active read device (reader), to acquire data from at least one other target (passive) device, acting as a listen device.

The communication is achieved by the initiator device emitting an RF magnetic field from an antenna coil which activates any NFC enabled target device in range. The initiator then sends a digitally encoded poll request by amplitude modulating the RF field. This is followed by the initiator generating an un-modulated carrier field for a specified period. If the target device is compatible, it responds by load modulating the un-modulated RF field to transmit a digitally encoded signal to the initiator. An exchange of digitally encoded signals follows culminating in the desired data communication. Load modulation is similar to a shallow AM modulation with a modulation index usually less than 10%.

It is becoming commonplace to integrate NFC communication capability in smart devices such as: mobile phones, tablet computers and like mobile devices. Such devices are thus NFC enabled and may behave optionally as either initiator or target according to the instant user desired functionality.

In order to NFC enable a cell phone, and maintain economies of fabrication, compact design and efficient energy usage, the various circuits and assemblies which NFC enable a cell phone exist in close proximity to circuits and assemblies which facilitate other connectivities such as: 2G, 3G and 4G communication, Bluetooth®, WiFi (IEEE 802.11x) FM radio, global positioning systems, and data processing, by way of non-exhaustive examples. It is common that the circuits for these functionalities cohabit on the same substrate (chip) and share the same signals, power lines, ground lines, and clock trees. This fact allows parasitic (unwanted) electromagnetic coupling between the cohabiting circuits. The intrinsic nonlinearity of active initiator NFC devices causes the emission of out-of-band disturbances (mainly higher order signal frequency harmonics). These disturbances induce a severe distortion, especially in the other wanted analog signals (called "aliasing"), and the distorting higher order signal frequency harmonics are called "aliases", (aliases are unwanted signals, particularly higher order harmonics). The disturbances also cause DC shift errors on sensitive nodes in the victim circuit, thereby driving the latter out of its correct operation mode. The aliases of the NFC carrier (13.56 MHz) can fall in the carrier bands of the smart device's other connectivities. These connectivities are then referred to as victims of aggressor NFC.

For active initiator NFC, so far, EMC (Electro Magnetic Compatibility) filters have been used to reduce the aforementioned cohabitation problems created by the initiator NFC device. A prior art EMC filter is illustrated in FIG. 1. The EMC filter 1 is a purely analog anti-aliasing filter inserted between a matching circuit 2 of an antenna 3 and network transmission terminals 4 of the active NFC device. The filter reduces the spectral density of the aliases.

In the device acting as the target (i.e. in tag-emulation mode), EMC problems arise resulting from the harmonics (sidebands) of the aforementioned load modulation. The load-modulation frequency is n*(13.56/128) MHz is such that n=[1, 2, 4, 8], the sidebands are located at N*n*(13.56/128) MHz where N=[1, 2, 3, . . . ].

A conventional EMC filter designed to filter out the 13.56 MHz harmonics is not at all efficient in filtering out the out-of-band harmonics (sidebands) of the much lower load-modulation frequency (n*[13.56/128] MHz). On the other hand, it is not possible to add a second EMC filter (for n*(13.56/128) MHz harmonics filtering) because it will filter out the carrier signal at 13.56 MHz. Filtering out the carrier signal results in filtering the transmitted data in both initiator (active) and target (passive/tag) emulation modes, which is of course undesirable.

A conventional circuit for load modulation of an NFC enabled device in target emulation mode is shown in FIG. 2. Modulation is achieved when a digital modulator 9 drives a switch 7, which intermittently connects a resistance 6 across the terminals TX1, TX2 of the EMC filter 2. The digital modulator is driven by "other blocks" which can be understood as an NFC controller such as a dedicated or general purpose processor running machine code to implement NFC. The resistance 6 has a single time independent value under constant operating conditions and will effect a change in the peak voltage seen at the aerial circuit terminals TX1 and TX2.

FIG. 3 is a graph of the voltages measured at the terminals 4 of the target (tag) EMC. The voltage for these purposes is the peak voltage of the carrier wave which is amplitude modulated to carry a digitized signal. In the prior art example of FIG. 3 a high voltage represents digital zero, while a low voltage represents digital one.

In general the modulation resembles a rectangular wave function (rect(t)) with the transition between low and high voltage occurring instantaneously. However, where the resistor switching occurs to change the digital value between "0" (~3.0-3.5V) and "1" (~1.5V) fast jumps occur which are equivalent to (indicative of) higher harmonics of the frequency of load modulation. That is to say, the frequency of the clock that generates load modulation data=n*(13.56/128) MHz). A fast time-domain jump (i.e. a rectangular time-domain signal: rect(t)) has a cardinal sine (sinc($\pi$f)) spectrum in the frequency domain. This means that the spectrum is not limited in the frequency domain because the cardinal sine spectrum is a spectrum where most of the energy of the signal is concentrated in the main lobe of the cardinal sine (this is the in-band, wanted part of the signal), and a tiny part of the energy of the signal is found in the side-band lobes (of the cardinal sine) that act as out-of-band unwanted harmonics which can aggressively interfere with victim connectivities.

SUMMARY

In an embodiment, an NFC enabled device capable of operating in a target mode is provided, wherein a load modulator is connected to a device antenna circuit to load modulate a radio frequency magnetic field by altering the voltage applied at the terminals of the antenna circuit, the modulation transitioning between a high amplitude and low amplitude to transmit a digital signal. The load modulator is responsive to a controller to impose a waveform on each transition which is a truncated step response of a low pass filter.

Further according to an embodiment, there is provided a method of load modulating the terminals of an antenna circuit to transition a carrier wave between a high amplitude and a low amplitude. The step of transitioning from the high amplitude to the low amplitude using a waveform is determined according to a truncated low pass filter step response.

The low pass filter is preferably tuned to a cut off frequency and sample frequency determined according to the specifications of a device, usually a chip, on which the NFC components and other connectivity components coexist. The waveform is truncated to avoid interference with subsequent transitions. Preferably the truncation is effected at a point where the amplitude of the waveform is substantially equal to the amplitude of the carrier at the end of the transition.

A preferred means of modulating the waveform at each transition is to apply a sequence of different resistance values, across the terminals of the aerial circuit, during the period of transition. Preferably, the resistances of the sequence are applied at regular intervals from the start of the transition period to the end. Because it is desired to control and shape the amplitude modulation of the voltages at the aerial circuit terminal during the transition, any means other than applying a sequence of resistances may be used. The values of the resistances of the sequence may be discrete, so that resistance changes are quantum, or the resistance may be varied continuously between a low to a high value.

BRIEF DESCRIPTION OF THE DRAWINGS

An embodiment of a near field communication device and a method of operation of the NFC device will now be described, by way of example only, with reference to the accompanying illustrative figures: in which.

DETAILED DESCRIPTION OF THE FIGURES

Figure 1:
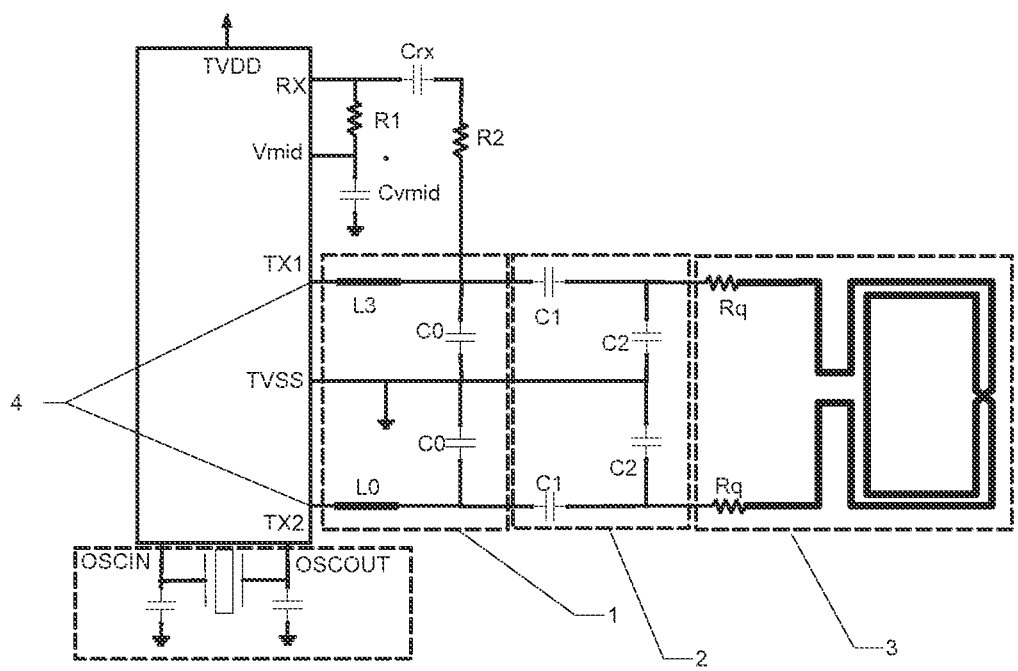
FIG. 1 shows a prior art EMC filter.
Figure 2:
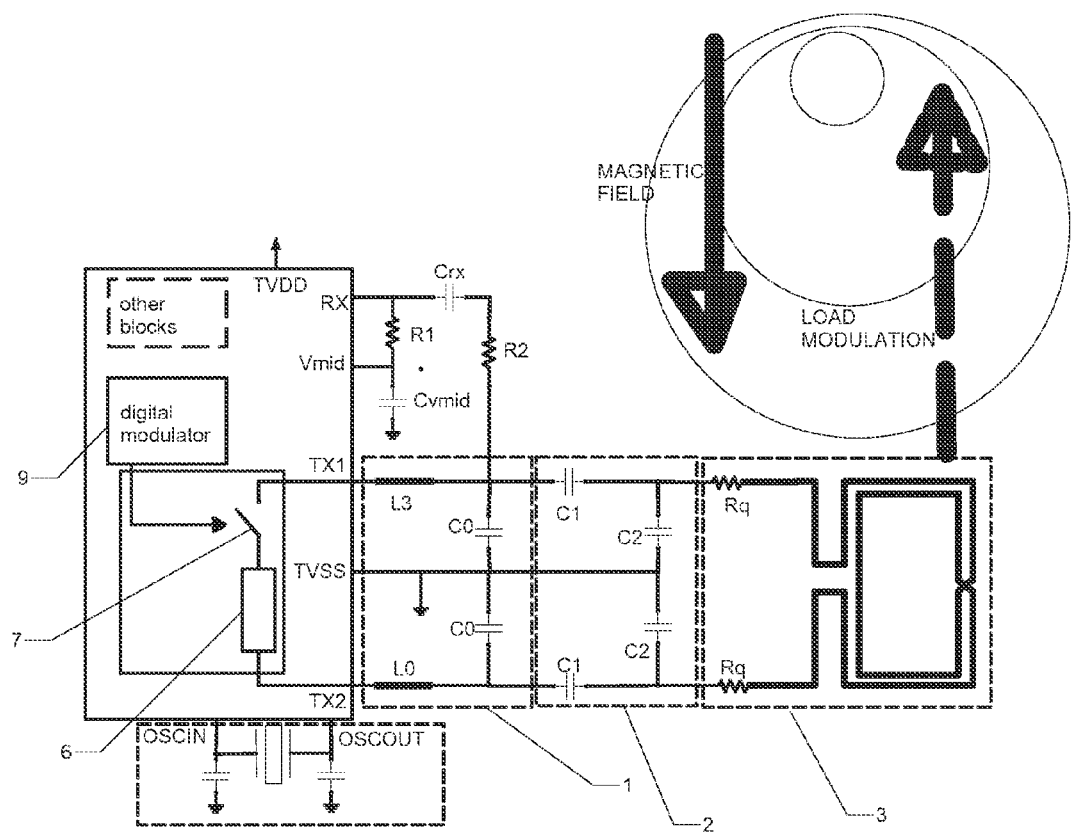
FIG. 2 illustrates a conventional circuit for load modulation of an NFC enabled device in target emulation mode.
Figure 3:
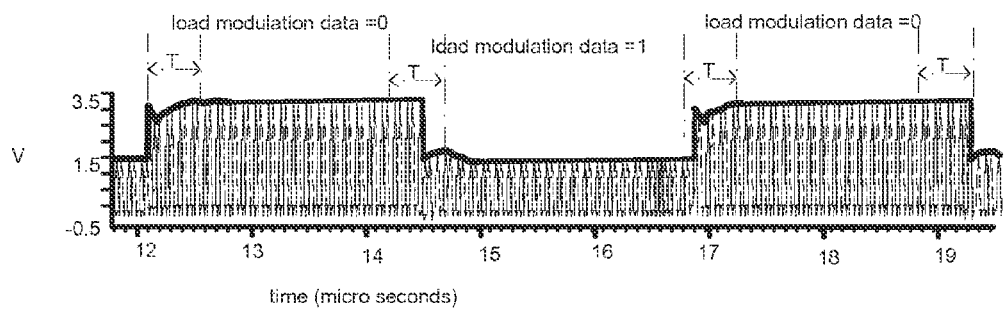
FIG. 3 is a graph of the voltages measured at a target.
Figure 4:
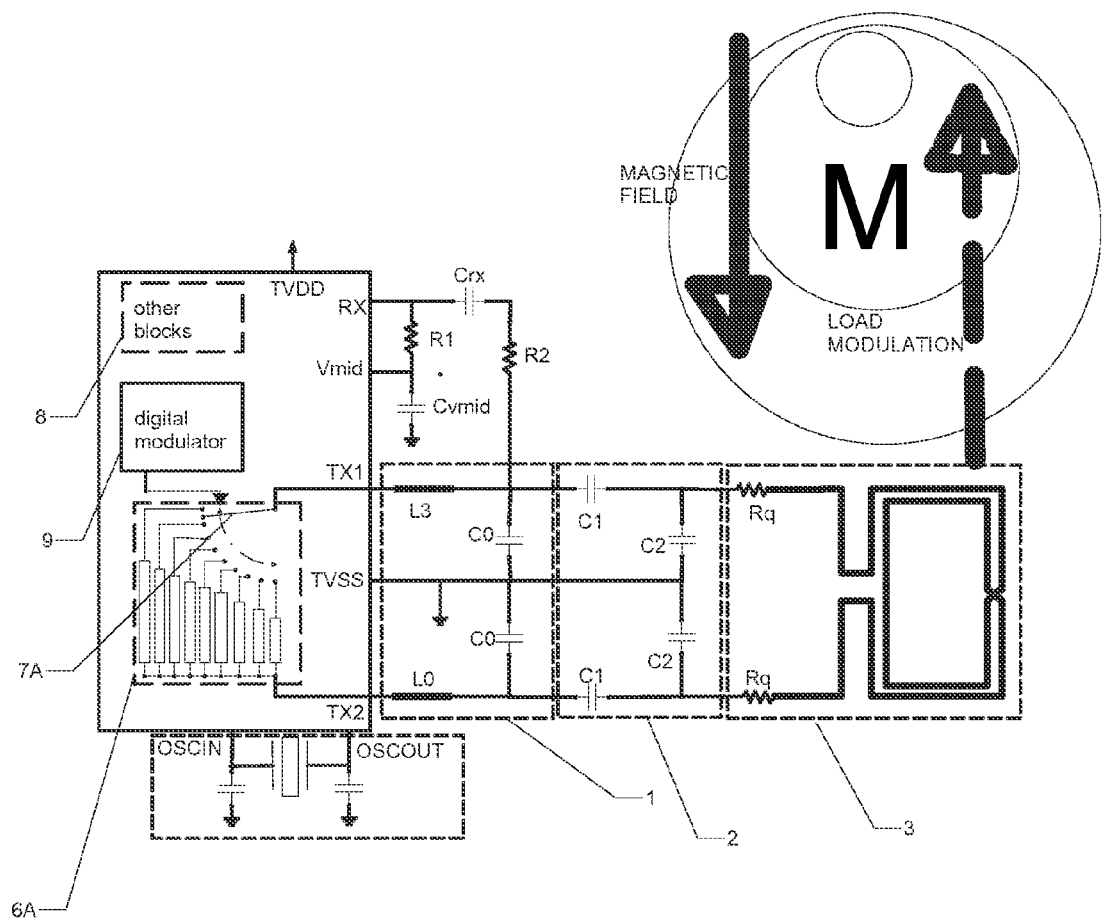
FIG. 4 diagrammatically illustrates an NFC device.

FIG. 4 shows diagrammatically the load modulation components of an NFC enabled device such as a cell phone. Components common to the FIG. 2 implementation are similarly numbered. Thus a digital modulator 9 is driven by "other NFC blocks" 8 and in turn drives a switch 7A of a load modulator 6A. The load modulator 6A connects a sequence of different value resistances 10 across the terminals TX1 and TX2 of an aerial circuit. The aerial circuit for these purposes comprises an EMC filter 1 delivering signal via a matching circuit 2 to an aerial 3. In this NFC device the load modulator sequentially connects a plurality of resistances 10, in this case eight (R1, . . . R8), across the terminals TX1, TX2. This arrangement alleviates the effects of fast jump (transitions) discussed with reference to the prior art and produces a waveform h(t) that is limited in the frequency domain. In other words the transition between low and high voltage at the terminals is deliberately progressive, instead of a step function ideally infinite in the frequency domain.

The modulator 6A is designed to implement a waveform h(t) derived from the step response of a low pass filter. The waveform is derived by generating the step response of an infinite impulse response low pass filter and truncating the resulting wave form to prevent interference between bit symbols (sequential jumps or transitions).

Figure 6:
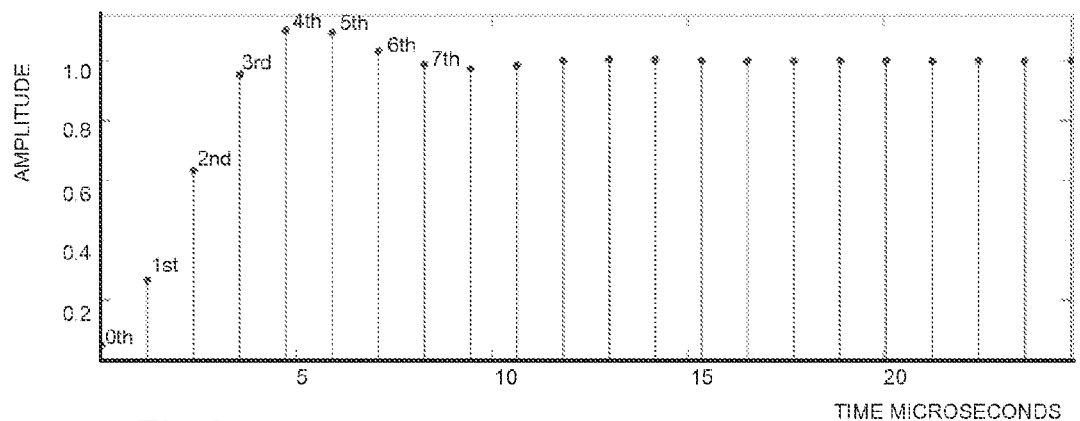
FIG. 6 is a graph of an infinite impulse step response applied to a low pass filter tuned to an exemplary NFC device chip.

The low pass filter is determined for the specification of a chip to be used to include the NFC components. The cohabitation and coexistence specifications of the exemplary chip require that the load modulation harmonic amplitudes be less than −113 dB referred to TX1 and TX2 when the NFC components are considered as aggressors. Simulation indicates that a third order infinite impulse response Butterworth low pass filter with a cut off frequency (fc) of 130 kHz and a sampling frequency (fs) of 8*(13.56/128) MHz (i.e. eight times the load modulation rate) is required to prevent cohabitation and coexistence violations. The step response of this filter is shown in FIG. 6.

The temporal truncation of the waveform to prevent interference is chosen to minimize discontinuities and thereby maintain the filtering properties of the infinite impulse low pass filter. In the example shown in FIG. 7 the truncation amplitude is approximately one at the eighth sample.

Figure 7:
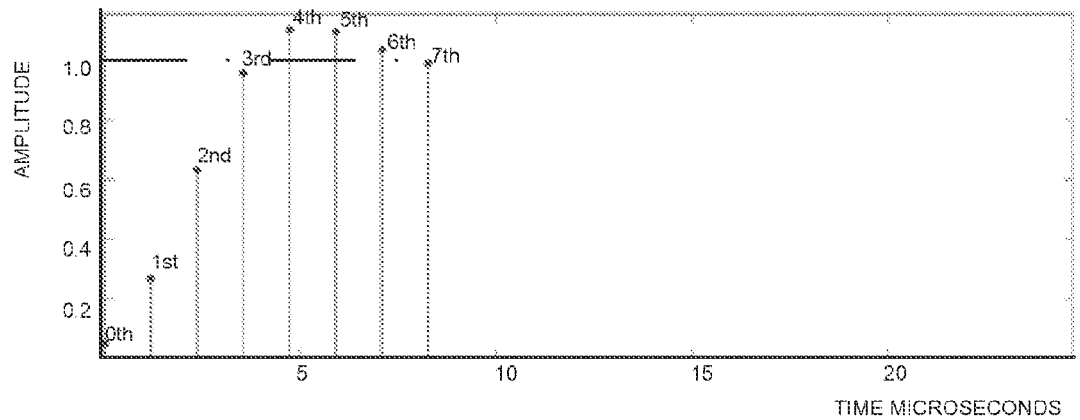
FIG. 7 is the graph of FIG. 6 truncated.

The load modulator is designed to apply a sequence of resistances to the terminals TX1 and TX2 selected to produce the load modulation waveform shown in FIG. 7.

Table 1 shows the amplitudes of the samples from the truncated waveform of FIG. 7.

TABLE 1

| Sample | Time (microseconds) | Amplitude |
|--------|---------------------|-----------|
| 0 | 0.000,000 | 0.052,2214,54 |
| 1 | 1.179,245 | 0.267,492,2 |
| 2 | 2.358,491 | 0.630,809,7 |
| 3 | 3.537,736 | 0.953,254 |
| 4 | 4.716,981 | 1.099,514 |
| 5 | 5.896,226 | 1.094,778 |
| 6 | 6.075,472 | 1.033,465 |
| 7 | 8.254,717 | 0.986,957,2 |

In order to implement the load modulation the load modulator 6A progressively applies eight loads (resistances) R0-R8 such that the ratio of the consecutive loads is equal to the ratios of the corresponding consecutive amplitudes. Initially only the first and last resistance values R0 and R8 are known, however the intervening values can be calculated as shown in Table 2:

TABLE 2

| Resistance ratio = | corresponding amplitude ratio |
|---|---|
| R0/R1 = | 0.267,492,2/0.052,214,54 = 5.122,944,7 |
| R2/R1 = | 0.063,080,97/0.267,492,2 = 2.358,235,9 |
| R3/R2 = | 0.953,254/0.630,809,7 = 1.511,159,4 |
| R4/R3 = | 1.099,514/0.953,254 = 1.154,342,3 |
| R5/R4 = | 1.094,778/1.099,514 = 0.995,692,6 |
| R6/R5 = | 1.033,465/1.094,778 = 0.943,995,0 |
| R7/R6 = | 0.986,957,2/1.033,465 = 0.954,998,2 |

It is therefore a simple calculation to determine appropriate values of the unknown resistance loads from either one of the known loads R0 or R7.

Figure 5:
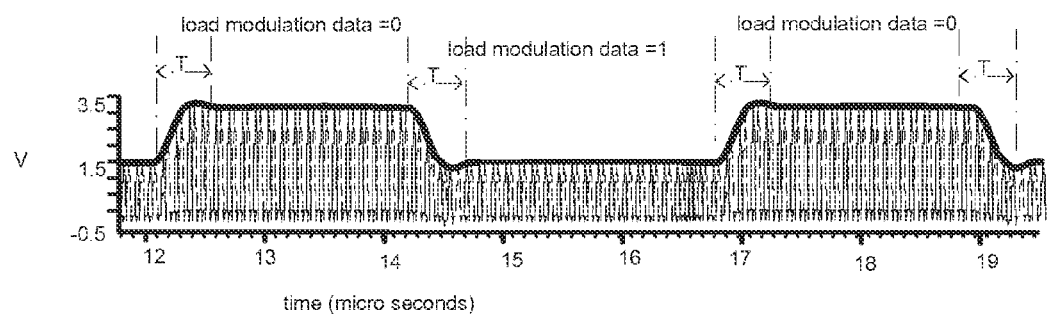
FIG. 5 is a graph of the step response of a 3rd order infinite impulse response Butterworth low pass filter with a cut off frequency (fc) of 130 kHz, and a sampling frequency (fs)=8*(13.56/128) MHz.

When transitioning from a wave form representing digital bit zero to digital bit one i.e. from high peak voltage (~3V) to low (~1.5V) the resistance values are applied in the order from R0 to R7, each for 1/8 of the transition time. When transitioning from digital bit one (low voltage) to digital bit zero (high voltage) the inverse resistance sequence is applied, i.e. from R7 to R0. The resulting envelope of the applied carrier is apparent from FIG. 5, particularly at the transition periods T.

Using this progressive load modulation during the operation of an NFC enabled device when acting as a target (passive or tag device) greatly attenuates the generation of aliases, and reduces the aggressive impact of operating NFC components on other components of the NFC enabled device.

The skilled person will understand that the diagram of FIG. 4 is intended to be a graphical representation of the functionality of the embodiment. There are several alternative ways of varying the load applied across terminals TX1 and TX2 in order to achieve the voltage control desired, including for example: serially connecting resistances to change the load; continuously variable resistor varied to emulate the desired waveform, variable conductors. The embodiment has been described as developed in relation to a specific chip in which the NFC components will be embedded. Even in this case the number of resistances applied may be varied, however, in the case of other chips with different coexistence and cohabitation specifications, the number and values of the resistances to be applied for optimal performance may differ from the example.

What is claimed is:

1. An NFC enabled device capable of operating in a target mode, comprising:
   a device antenna circuit;
   a load modulator connected to the device antenna circuit and configured to load modulate a radio frequency magnetic field by altering the voltage amplitude of a carrier wave applied at terminals of the device antenna circuit, wherein the modulation transitions between high and low values to transmit a digital signal,
   wherein the load modulator alters the voltage amplitude of the carrier wave applied at the terminals of the drive antenna circuit by:
      applying a sequence of resistances of different values across the terminals in a first predefined order during a first transition between a high value and a low value, and
      applying the sequence of resistances of different values across the terminals in a second predefined order opposite from the first predefined order during a second transition between the low value and the high value,
   a controller configured to impose a waveform on each transition by the load modulator which is a truncated step response of a low pass filter so as to attenuate generation of out of band higher order harmonics.

2. The NFC enabled device according to claim 1, wherein the resistances are discrete values.

3. The NFC enabled device of claim 1, wherein the sequence of resistances of different values are selected so as to produce a specific load modulation waveform.

4. A method of load modulating a magnetic field by an NFC enabled device operating in a target mode, comprising:
   transmitting a digitally encoded signal by amplitude modulating a carrier to transition between a high amplitude and a low amplitude;
   increasing or reducing a load applied across terminals of an antenna circuit by varying a load applied to impose a waveform on each transition which is a truncated step response of a low pass filter so as to attenuate generation of out of band higher order harmonics;
   wherein the load is varied by:
      applying a sequence of resistances of different values across the terminals in a first predefined order during a first transition between the high amplitude and the low amplitude, and
      applying the sequence of resistances of different values across the terminals in a second predefined order opposite from the first predefined order during a second transition between the low amplitude and the high amplitude.

5. The method according to claim 4, further comprising tuning the low pass filter so that the load modulation of the NFC device on chip attenuates aliases of the carrier to a degree where they do not interfere with other on chip functions.

6. The method according to claim 4, wherein the resistances have discrete values.

7. The method according to claim 6, wherein applying comprises applying the resistances at uniform intervals during the transition period.

8. A circuit, comprising:
   a device antenna circuit including first and second transmission terminals coupled to a filter and matching circuit;
   a plurality of resistors configured to be selectively connected between the first and second terminals; and
   a digital modulator circuit configured to control the selective connecting of the resistors during logic state transition periods of data transmission to impose a waveform on each logic state transition which is a truncated step response of a low pass filter by:
      applying resistors of the plurality thereof in a first predefined order between the first and second terminals during a first transition of the waveform, and
      applying resistors off the plurality thereof in a second predefined order opposite from the first predefined order between the first and second terminals during a second transition of the waveform.

* * * * *